United States Patent

Anke

[11] Patent Number: 6,114,618
[45] Date of Patent: Sep. 5, 2000

[54] METHOD AND DEVICE FOR OPTIMIZING THE POSITION OF THE STRINGS ON STRINGED AND PLUCKED INSTRUMENTS

[75] Inventor: Gerhard Anke, Berlin, Germany

[73] Assignee: Plek Gitarrentechnologie GmbH, Berlin, Germany

[21] Appl. No.: 09/171,061

[22] PCT Filed: Feb. 10, 1998

[86] PCT No.: PCT/DE98/00443

§ 371 Date: Apr. 16, 1999

§ 102(e) Date: Apr. 16, 1999

[87] PCT Pub. No.: WO98/35338

PCT Pub. Date: Aug. 13, 1998

[30] Foreign Application Priority Data

Feb. 11, 1997 [DE] Germany .................. 297 03 290 U

[51] Int. Cl.[7] .................................................. G10D 3/06
[52] U.S. Cl. .................................... 84/314 R; 84/454
[58] Field of Search ........................... 84/293, 314 R, 84/454

[56] References Cited

U.S. PATENT DOCUMENTS 4,037,510 7/1977 Ginex et al. .................. 84/314 R X
4,777,858 10/1988 Petschulat et al. .................. 84/314 R

*Primary Examiner*—Jeffrey Donels
*Attorney, Agent, or Firm*—Wood, Phillips, VanSanten, Clark & Mortimer

[57] ABSTRACT

A method and device for optimizing the position of the strings on stringed and plucked instruments, especially guitars, and for improving the playability of such instruments. The instruments include strings which are stretched across a fretted or fretless fingerboard, wherein the profile of the fingerboard surface is measured underneath each individual tightened string. The optimum form of the fingerboard surface is determined for each string by a computer on the basis of string parameters, the aim being to keep the distance between the strings and the fret surfaces to a minimum without impeding the vibration of the strings. Subsequently, the differences between the calculated and real fingerboard surface profiles are compensated by a computer-controlled machine. The instrument which is tuned with high precision and adjusted to a minimum string position is characterized by excellent playability and clear intonation.

19 Claims, 4 Drawing Sheets

1.48 MEASUREMENT (12. FRET)
1.40 OPTIMUM (12. FRET)

2.35 MEASUREMENT (12. FRET)
2.35 OPTIMUM (12. FRET)

1.99 MEASUREMENT (12. FRET)
1.40 OPTIMUM (12. FRET)

2.00 MEASUREMENT (12. FRET)
2.35 OPTIMUM (12. FRET)

METHOD AND DEVICE FOR OPTIMIZING THE POSITION OF THE STRINGS ON STRINGED AND PLUCKED INSTRUMENTS

FIELD OF THE INVENTION

This invention relates to a method for optimizing the position of the strings of stringed and plucked instruments.

BACKGROUND OF THE INVENTION

Playability, which is primarily characterized by the force required to press down the strings, is a major criterion for the quality of musical instruments of the above-mentioned type. First of all, this string pressdown force depends on the distance between the lower edge of the string and the upper edge of the fingerboard, or, with fretted instruments, the frets.

The term "fingerboard surface" shall denote herein the surface profile of the fingerboard, both for fretted instruments (such as guitars) and fretless instruments (such as stringed instruments, but also fretless electric bass guitars), no matter whether fretwires are inwrought or not. In top view, most fingerboards have a trapezoid plane as they get wider towards the body; this plane is found, for example, in classical guitars. But they may also have a cambered surface as with stringed instruments, electric and Western guitars; in this case, their three-dimensional shape corresponds to a patch of the lateral surface of a truncated cone.

Although this description focuses on measuring and processing fretted instruments (e.g. guitars) for convenience and clarity, the facts described apply likewise to fretless instruments, only that with the latter the string does not strike on the frets but on the wood of the fingerboard if, for example, the distance is too small.

However, the distance between the strings and the frets cannot be reduced to any small measure to keep the string pressdown force to a minimum as the vibration of the string may be impeded by its striking on the nearest following frets. The neck of the instrument or a line across its fret surfaces has to be slightly curved to give a vibrating string the space required at each point of the fingerboard. There is only one optimum fingerboard profile for each string of an instrument at a constant temperament. Any deviation from this line means that either the string is positioned too high above the fingerboard, which impedes playability, or it is positioned too low and strikes on the nearest following frets (or on the fingerboard surface) when vibrating.

Unless prevented by the design or material properties of, the neck of some instruments can be deflected due to the tensile stress exerted by the strings. Such deflection, on the one hand, is not uniform because the neck of the instrument thickens towards the body, and because the end of the fingerboard is directly glued onto the sound board (or onto the solid body, for example, of an electric guitar); on the other hand, it can hardly be predetermined due to the specific properties of the material wood. The result are composite curve sections with different curvatures. Optimum curvature adjustment using the neck adjusting screw that some instruments have (it counteracts the tensile stress exerted by the strings inside the neck) is also impossible due to the varying thickness of the neck.

Another problem is the fact that the distance of the fret surfaces from the wood of the fingerboard surface is not uniform, which is caused by the manufacturing process (manual hammering or pressing in of the fretwires) and by fret wear and tear when the instrument is played. The mechanized and the manual manufacturing process both cause deviation in the relevant range (>0.02 mm). This is traditionally taken into account by manual grinding (so-called tuning) of the fret surfaces. The deflection caused by the tensile stress exerted on the neck by the strings cannot be taken into account in this process because the strings have to be removed and no precise values are known as regards the quantity of material to be ground off from the fret surfaces.

The mode of vibration of the string also influences the required curvature of the fingerboard. It mainly depends on the properties of the string material (steel/nylon, diameter, bare/covered, tensile stress, diapason length, etc.) and on the force with which the vibration is excited (temperament). As the various strings of an instrument differ in gauge and have different tensile stresses, the fingerboard curvature has to vary along each individual string. The required fingerboard profile of heavier-gauge and less tightened strings has a sharper curvature in line with their vibration envelope. Therefore the curve is the flatter the thinner the string and the greater its tensile stress. Moreover, the required fingerboard curvature increases (or decreases) as a function of temperament in proportion to the larger (or smaller) oscillation amplitude of the string.

These differences in the vibration behaviour of the individual strings is not taken into account in conventional fingerboard processing as no binding values are known and the accuracy required for curving the fingerboard individually for each string (+/−0.02 mm) in order to give the fingerboard along each string an individual curvature cannot be achieved by manual tuning. Conventional tuning of the fingerboard by which the upper fretwire edges are manually ground to height in a curved plane is limited in effectiveness.

It is therefore the problem of this invention to provide a method for optimizing the individual position of the strings on stringed and plucked instruments to achieve good playability that does not depend on manual skills and does not take much time, and to provide a corresponding device for carrying out this method.

SUMMARY OF THE INVENTION

Thus a method for optimum position adjustment of the strings of mass or manually produced, new or used stringed and plucked instruments, especially guitars is provided that allows to keep the distance between an individual string and the fingerboard or fretwires underneath it to a minimum based on the complex interaction of various characteristics (such as neck curvature, differing states of wear of the fingerboard surface profile, differing fret heights or worn fretwires, string parameters determined by material used, string gauge and type, or diapason) and prevents the vibrating string from striking on the fretwires and producing the undesired "buzzing" or "clashing" of the strings.

The playing characteristics of the instrument are considerably improved by the described method with the string pressdown force achieved due to the minimum distance between string and fingerboard, without requiring particular craftsmanship or experience for the treatment of the instrument. Computer-controlled machining of the fingerboard profile or the fretwires allows precision within a range of +/−0.01 mm and produces smoothest surfaces, which further enhances playing comfort. Material can be removed not only from the fretwires but also from the fingerboard itself.

In an embodiment of the invention, the fingerboard curvature in relation to the string position can be calculated by additionally taking into account the user's temperament, which will further improve the quality of the instrument.

Each string has to be brought into its calculated position at its two points of support (nut and bridge) to adjust the height of the strings above the fingerboard. This is done according to the invention by means of grooving, preferably milling in, V-shaped notches with the same angularity in nut and bridge of the instrument in which thick and thin strings are fixed equally well. The fact that one and the same milling tool can be used for the different string gauges is beneficial for, with the tool shape given, the resulting height of each string within the notch can be calculated by the computer and it is no longer necessary to form rounded notches of varying thickness but just to groove in the V-shapes at the respective heights. If the material used or the constructive features of nut and bridge prevent machining (for electric guitars, the position of the strings can usually be adjusted at the bridge using screws) adjustment can be carried out manually, the measured value of the actual string position being indicated at the computer.

The device according to the invention for carrying out the method of the invention includes a measuring head and machining tool, both movable in three dimensions, with a mobile or stationary fixing apparatus for the instrument to be machined in their travelling path. The measuring and machining tools are connected to a computer and data memory which records and stores all relevant parameters and measured values of the instrument including temperament, from which it calculates and graphically represents the optimum fingerboard curvature and position of the string, as well as parameters required for machining and the three-dimensional movements of the measuring and machining tools.

The subclaims and the subsequent description of an embodiment give more characteristics, useful enhancements and benefits of the invention.

BRIEF DESCRIPTION OF THE DRAWINGS

An embodiment of the invention shall now be explained in more detail based on the figures enclosed, where.

DETAILED DESCRIPTION OF THE EMBODIMENT

Figure 1:
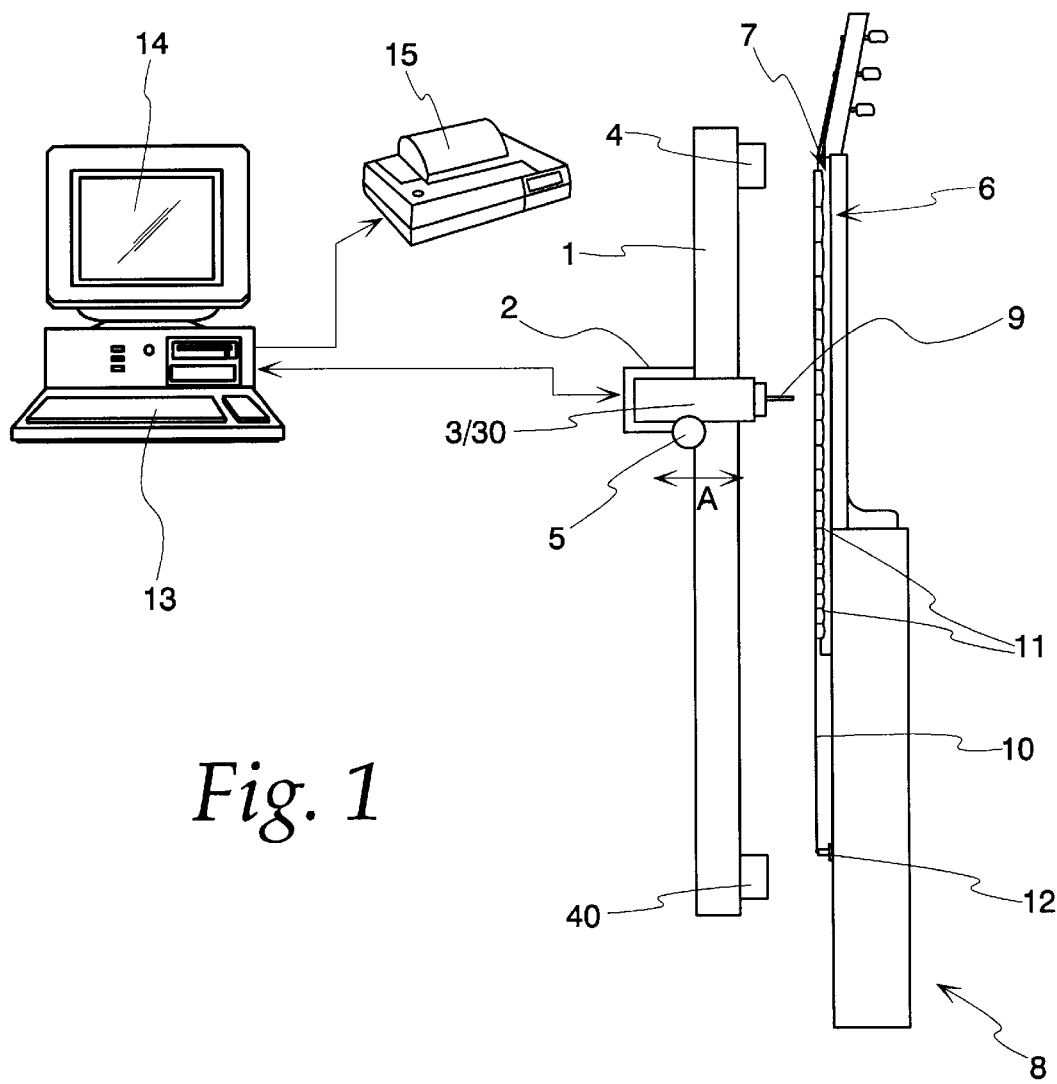
FIG. 1 shows an apparatus for measuring and tuning the fingerboard profile of a guitar associated with the device.

The guitar 8 shown in side view in FIG. 1 is fastened with rubber bands on a mobile holding device (not shown) which is subsequently fixed to a measuring and tuning apparatus. The holding device is equipped with adjustable receiving members to fasten instruments of various types and sizes.

The measuring and tuning apparatus consists of a in this case vertical guide rail 1 which is mounted on two transverse rails 4 and 4a along which it can be moved in perpendicular direction to the figure plane. It guides a driven sliding carriage 2. The guide rail 1 and the sliding carriage 2 are driven by electric motors 5 controlled by a computer 13. A tuning tool 3 and/or a measuring head 3a can be mounted alternately (or simultaneously) to the carriage using a holding member 9. As indicated by arrow A, the tuning tool 3 and the measuring head 3a can be moved with the carriage 2 in perpendicular direction to the direction of travel of the guide rail 1. The guitar 8 to be machined is positioned to the measuring and tuning apparatus such that the fingerboard 7 of neck 6 and therefore with the strings 10 and fretwires 11 facing the tuning tool 3 or measuring head 3a. The measuring head 3a and the electric motors for driving the carriage 2 and the guide rail 1 are connected to the computer 13 with data memory and monitor 14 and with a printer 15.

After measuring the gauge of the strings and the spacing between strings, and after input of this data and other string parameters into the computer 13, the fingerboard profile underneath each tightened string is measured subsequently, based on a reference string, by mechanical or non-contact scanning using the measuring head 3a. The result is input and stored in the computer while the respective string is displaced laterally using the holding member 9 during the measuring procedure.

Moreover, the position of the string, i. e. the distance between the lower edge of a string 10 and the upper edge of a fretwire 11 is measured for each string 10 at the first and twelfth fret. The result of the measurement is displayed on monitor 14 of the computer 13.

Based on the previously input string parameters namely diameter, material and string type, string pitch, and diapason as determined by the distance between bridge 12 and nut 16 and, optionally, the temperament of the respective musician as individually determined using test instruments, the computer 13 subsequently calculates the optimum surface profile, i. e. the optimum curvature of the upper edges of the fretwires 11, which safely prevents a vibrating string 10 pressed down from a minimum height, and therefore with low pressdown force, against one of the fretwires 11 from striking against another fretwire of the fingerboard.

Figure 3B:
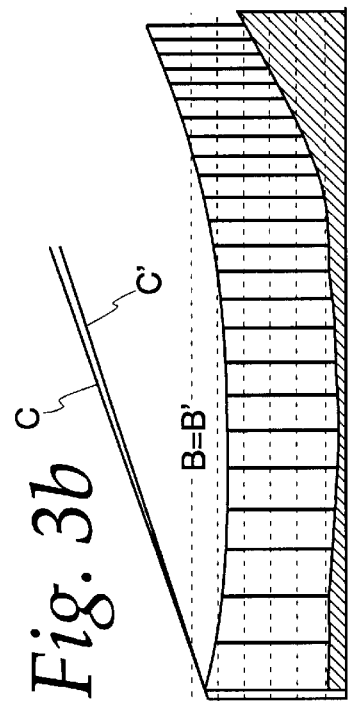
FIGS. 3a and 3b show a graphic representation of the surface profile measured underneath a thin string and the position of the string as well as the optimum curvature prior to tuning (FIG. 3a) and after tuning (FIG. 3b)
Figure 4B:
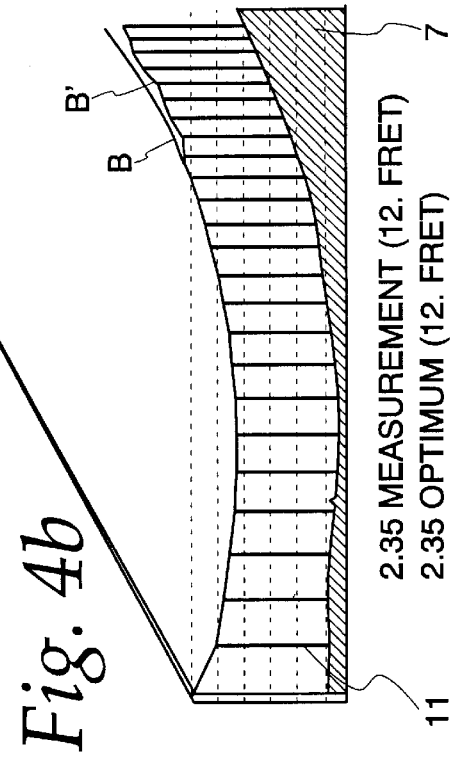
FIGS. 4a and 4b show a graphic representation of the measured surface profile and the position of the string as well as the calculated optimum curvature of a thick string prior to tuning (FIG. 4a) and after tuning (FIG. 4b)
Figure 3A:
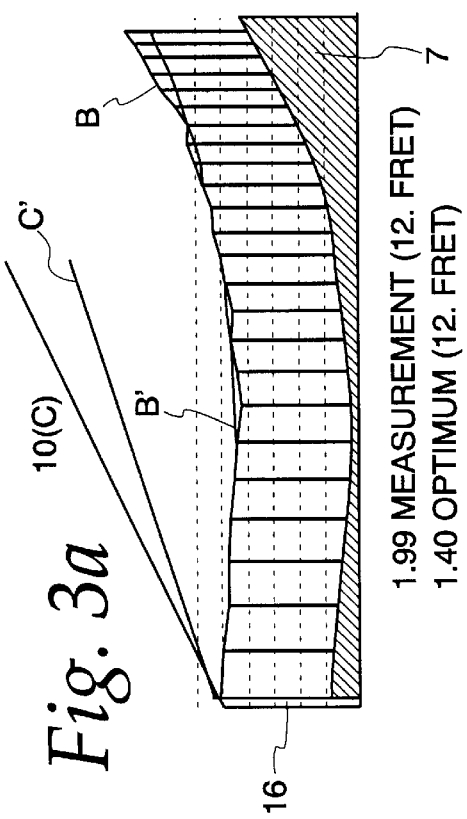
Figure 4A:
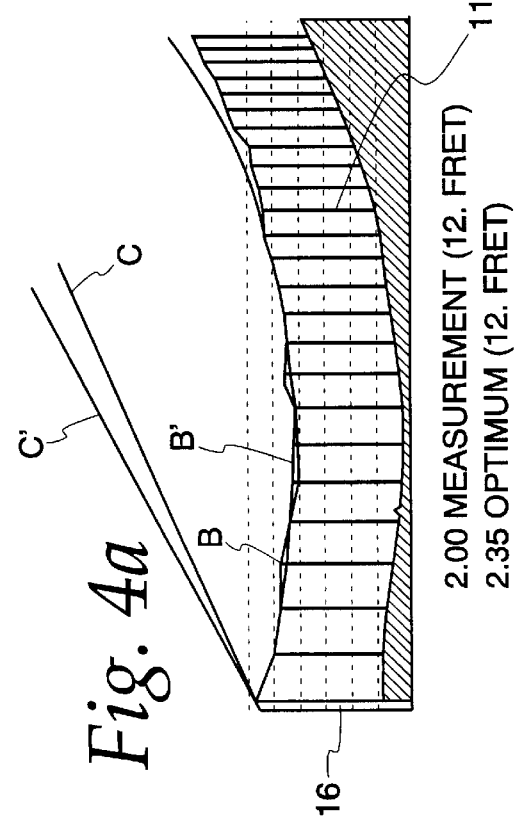

FIGS. 3a and 4a show the graphic representation of a previous measurement including the calculated optimum curvature of the upper fretwire edges and the optimum position of the string as displayed on the monitor 14 or printed at the printer 15 for a thin bare steel string of gauge 0.23 mm (FIG. 3a) and for a thick covered steel string of gauge 1.07 mm. The graph shows as measurement results the profiling in longitudinal direction of the fingerboard 7, the bridge 16, the height of the fretwires 11 and the string 10 (dashed line C). The fat full-line curve B shows the measured curve of the upper edges of the fretwires 11 while the thin full-line curve B' represents the calculated optimum curve of the upper fretwire edges. The solid straight line C' shows the calculated optimum position of the respective string 10 above the optimum height of the fretwires 11.

A comparison of the results of measurement and the calculations shown in FIGS. 3a and 4a clearly shows that for the thin string the curve of the fretwire heights is much flatter, and the distance between string and upper fretwire edge are much lower than for the thick string. In addition, the thin string can be positioned deeper in relation to the height of the fretwires 11 while the thick string requires a greater distance to the fretwires 11 to prevent the string from striking on them. The figures given in the drawings represent the measured and the optimum distance in millimetres between the upper edge of the fretwire and the lower edge of the respective string (at the 12$^{th}$ fret).

Figure 2:
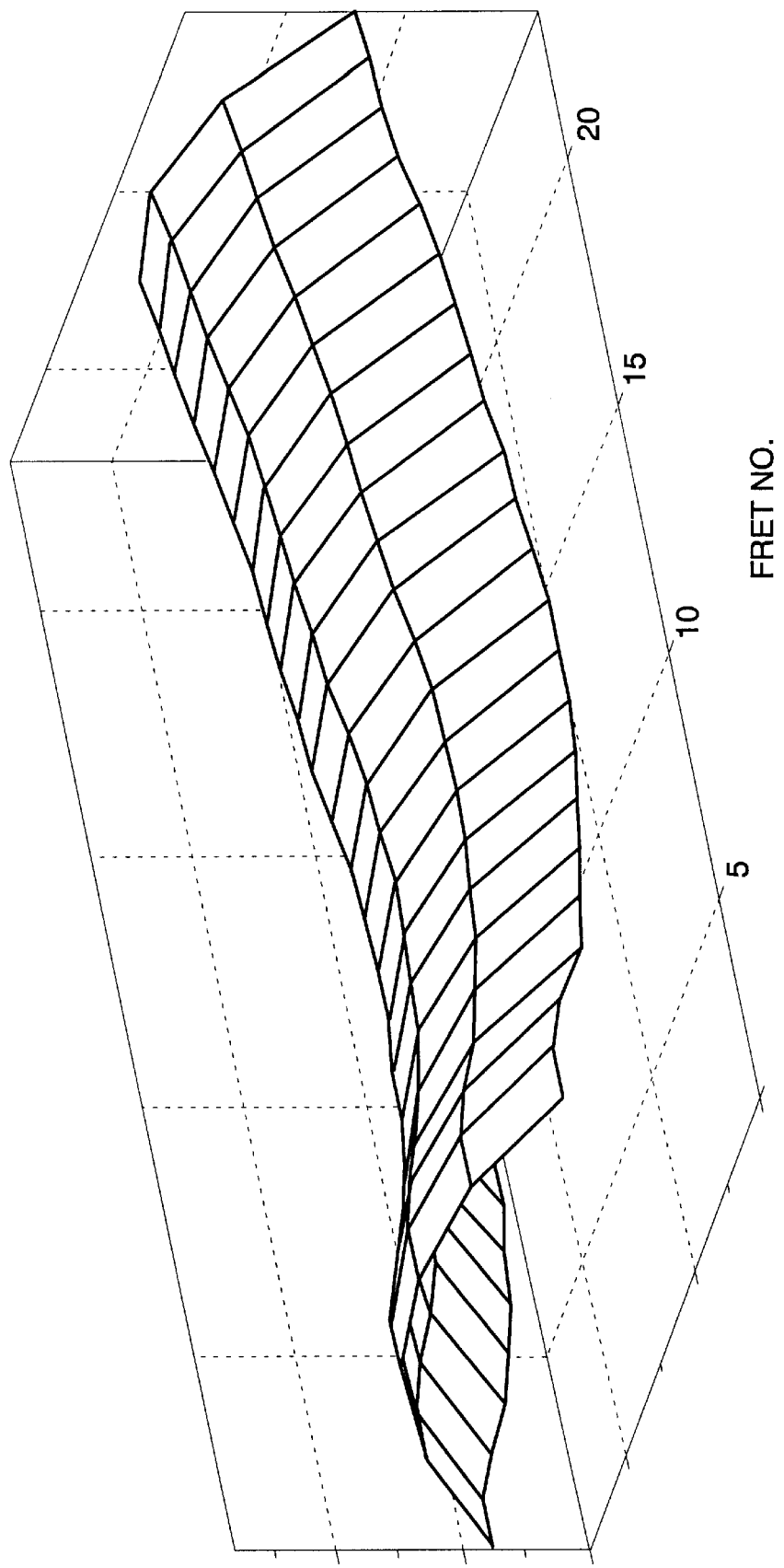
FIG. 2 shows a graphic representation of measuring points of the surface profile of the fingerboard of a guitar that are connected by a line.

Now the strings 10 are removed, and the tuning tool 3 mounted on the carriage 2 travels computer-controlled over the respective fretwires 11 across the width of the fingerboard 7 to grind off the differential height between the measured and the optimum fretwire height from the upper surface of the fretwires 11 taking into account the differential values between the measured and optimum curve of the upper fretwire edge underneath each string. As a result, the fingerboard will have the profile shown in FIG. 2 as regards the individual machining points of the fretwires 11. It is apparent from the drawing that the surface of the fingerboard is curved not only in longitudinal direction but in transverse direction as well, which means that the curvature in longitudinal direction is sharper for heavier-gauge strings than for thin strings.

Figure 5:
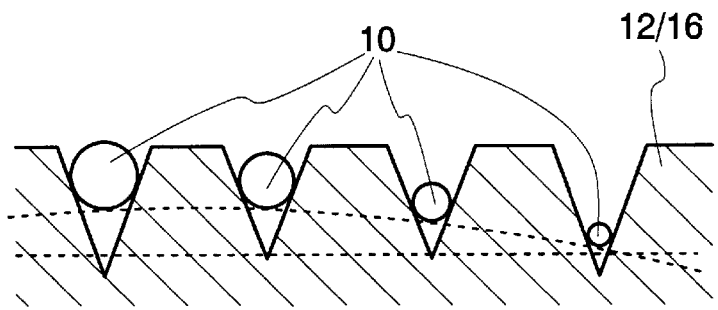
FIG. 5 shows a section across the nut with V-shaped notches and strings of differing gauges lying in the notches.

After grinding off and flattening the upper surface of the fretwires 11 that usually have a semicircular profile, the side edges formed are rounded by grinding to further improve playability and quality of sound. At the same time, a very smooth fretwire surface is produced, which also has a beneficial effect on playing quality. Subsequently, the strings 10 are mounted again and set to their optimum position as determined above the nut 16 and bridge 12. When the distance is set between the upper fretwire edges and the lower string edge above the nut 16 and/or the bridge 12, V-shaped notches are machine-cut into these at a higher or lower level as required by the desired string position, the length of said notches being short (ca. 2 mm) and the area behind said notches being cut out. As FIG. 5 shows, these notches can be cut using one and the same tool for strings of different gauges and various string positions because the angles remain the same. Furthermore, each V-shaped notch safely holds each string, thick or thin.

After mounting the strings and setting the optimum string position as described above, the height of the fretwires and the position of the strings are measured once again, and the result obtained is compared with the respective optimum (calculated) values. It becomes apparent from the diagram displayed on the monitor 14 or on the printout and shown in FIGS. 3b and 4b that the actual (measured) and the optimum (calculated) values of the fretwire heights and the positions of the strings are now mainly identical, and that an instrument has been provided that is easily playable with minimum string pressdown force, exact stopping and clear intonation and adjusted to the user's temperament.

Figure 6A:
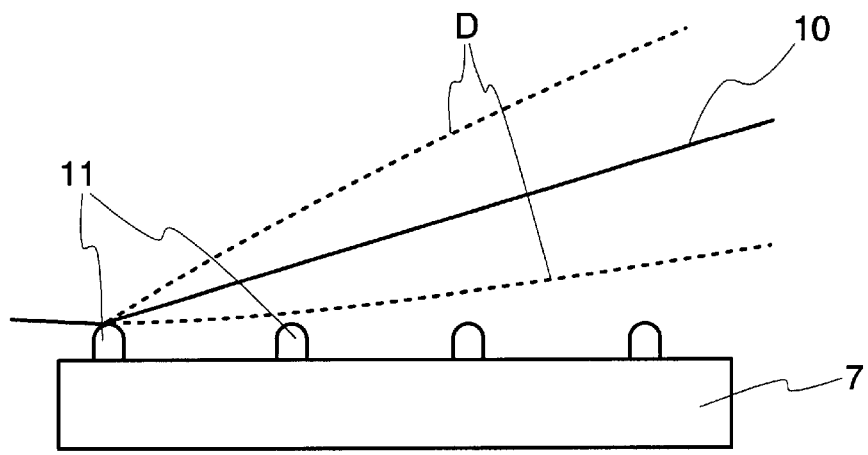
FIGS. 6a and 6b show a diagrammatic side view of a straight and curved guitar neck and a vibrating string.
Figure 6B:
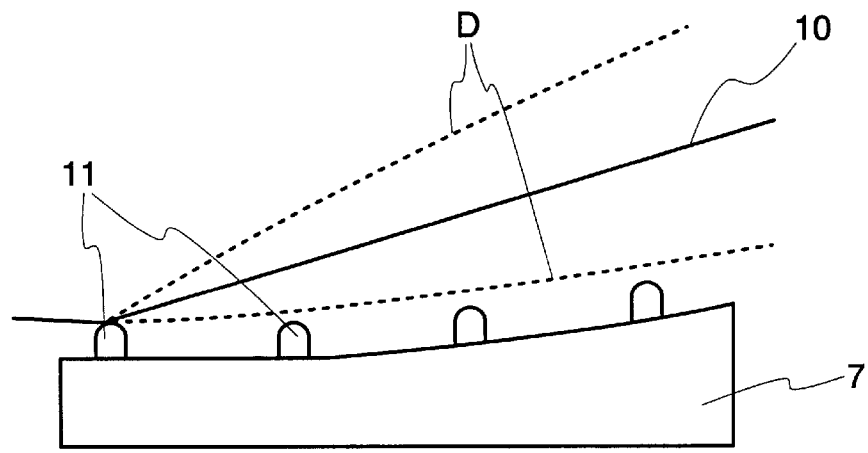

FIGS. 6a and 6b illustrate how the fingerboard curvature is adjusted to envelope D (maximum amplitude) of the string 10 (FIG. 6b) by comparing a straight profile (FIG. 6a) and a profile curved according to the invention (FIG. 6b) of a fingerboard 7 with fretwires 11 to keep the distance between the string and the fretwires at a minimum, whereas a great distance has to be kept and the string pressed down with great force in FIG. 6a to prevent it from striking against the fretwires (clattering).

List of reference marks

| | |
|---|---|
| 1 | guide rail |
| 2 | carriage |
| 3 | tuning tool |
| 3a | measuring head |
| 4 | transverse rail |
| 4a | transverse rail |

List of reference marks—continued

| | |
|---|---|
| 5 | electric motor |
| 6 | neck |
| 7 | fingerboard |
| 8 | guitar |
| 9 | holding member |
| 10 | string |
| 11 | fretwire |
| 12 | bridge |
| 13 | computer |
| 14 | monitor |
| 15 | printer |
| 16 | nut |
| B | measured curve of upper fretwire edge (curvature) prior to tuning |
| B' | calculated (optimum) curve of upper fretwire edge (fingerboard curvature) |
| C | measured string position |
| C' | calculated (optimun) string position |
| D | envelope of the vibrating string |

What is claimed is:

1. A method of optimizing the position of strings on stringed and plucked instruments with a fretted or fretless fingerboard surface, over which strings are stretched by tuning the fingerboard surface, said method comprising the steps of:

measuring the actual profile of the fingerboard surface underneath each stretched string using a computer-controlled measuring and tuning apparatus;

calculating an optimum profile of the fingerboard surface by taking into account specific vibration behavior of each string to minimize the distance between each string and the fingerboard surface using a computer; and removing from the fingerboard surface a differential amount that is the difference between the optimum profile and the actual profile using a machine.

2. Method according to claim 1, wherein optimum fingerboard curvature and string position are calculated taking into account the individual temperament of the musician as determined using various test instruments with different positions of the strings.

3. Method according to claim 1, wherein the differential amount is taken off point-by-point at the upper surface of fretwires across the width of the fingerboard in the area of the respective string, and lateral surfaces of the fretwires are subsequently rounded.

4. Method according to claim 3, wherein the differential amounts are taken off between individual measuring points in the form of a smoothed curve.

5. Method according to any one of claims 1 through 4 wherein fretwires are machined with the strings removed, and the string position as determined in relation to the curve of an upper fretwire edge is subsequently adjusted at at least one of a nut and bridge on the stringed or plucked instrument.

6. Method according to any one of claims 1 through 5, wherein the length of each vibrating string may optionally be adjusted by changing its resting position in at least one of a nut and bridge.

7. Method according to claim 5, wherein the resting position is set by computer-controlled machining or manually and verified using a computer.

8. Method according to any one of claims 5 through 7, wherein the position of strings with differing gauges is set by cutting V-shaped notches having the same angle at various levels into at least one of a nut and bridge in accordance with the respective string position and by cutting out the area behind said V-shaped notches.

9. Method according to claim 3, wherein material is taken off from the fingerboard between fretwires if the fretwire height is low.

10. Method according to claim 1, wherein the fingerboard surface underneath the respective string is measured using mechanical or non-contact methods, and material is taken off from fretwires, a nut and bridge, or the fingerboard surface between the fretwires using cutting processes.

11. Method according to claim 10, wherein the fingerboard surface is measured successively or simultaneously.

12. Method according to claims 10 and 11, wherein measurement is carried out using at least one of laser, ultrasound, compressed air or limiting switches.

13. Method according to claim 1, wherein the parameters determining the vibration behaviour of the individual strings including the diapason of the instrument and, optionally, the individual temperament and measured values such as string spacing, string position and fingerboard profile are stored in a computer, and that the calculated and real fingerboard contour and string position are displayed in a diagram in which the measured and calculated curve of fretwire heights are matched to minimize material removal.

14. Method according to claim 1, wherein another measurement is carried out after machining the fingerboard surface, setting the string position and tightening the strings which is compared with calculated optimum values for string position and curvature.

15. Method according to claim 1, wherein the neck profile with the strings tightened is simulated by fastening fixtures that are independent of the strings.

16. Method according to claim 1, wherein the method is carried out using a measuring head and a tuning tool, both movable in three dimensions and each connected to a computer with a data store for storing the parameters and measured values of the respective instrument and for calculating the optimum fingerboard curvature and string position as well as for controlling the tuning tool or measuring head, and a mobile or stationary fixing apparatus for the instrument that can be mounted in the area of the tuning tool or measuring head.

17. Method according to claim 16, wherein at least one of the measuring head and tuning tool is mounted on a carriage movable in Y- and Z-direction on a guide rail, which is movable along transverse rails in X-direction, both movements being driven by drives controlled by the computer.

18. Method according to claims 16 and 17, wherein the measuring head is equipped with a holding member to push the string out of the measuring range when measuring with strings tightened.

19. Method according to claims 16 and 17, characterized in that the measuring head is equipped with a curved tracer tip that grips under the string.

* * * * *